C. R. COCHRAN.
NUT LOCK.
APPLICATION FILED JULY 7, 1916.
1,260,645.
Patented Mar. 26, 1918.
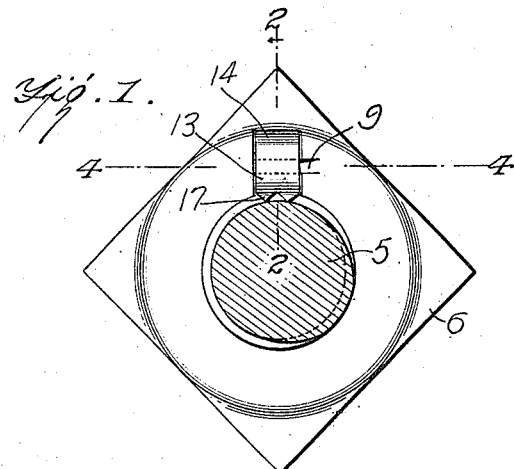
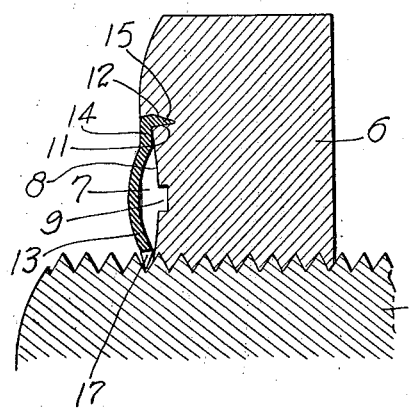
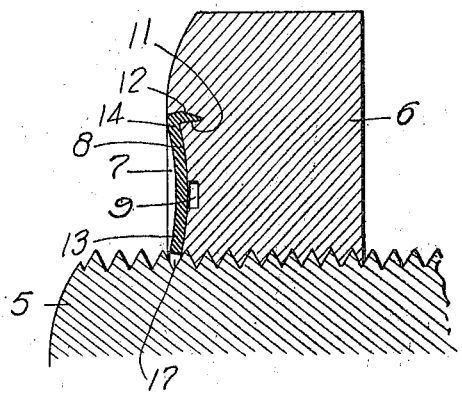
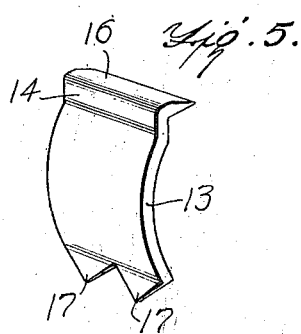
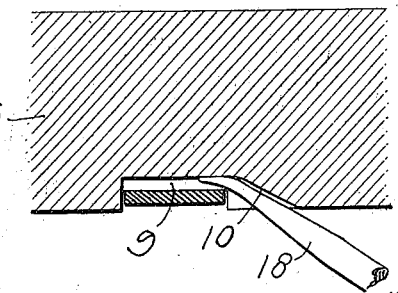
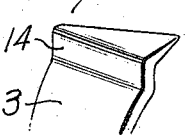
WITNESSES
INVENTOR
CHARLES R. COCHRAN,
BY
ATTORNEYS

UNITED STATES PATENT OFFICE.

CHARLES R. COCHRAN, OF BROGAN, OREGON.

NUT-LOCK.

1,260,645.    Specification of Letters Patent.    Patented Mar. 26, 1918.

Application filed July 7, 1916. Serial No. 107,992.

*To all whom it may concern:*

Be it known that I, CHARLES R. COCHRAN, a citizen of the United States, and a resident of Brogan, in the county of Malheur and State of Oregon, have invented a certain new and useful Improvement in Nut-Locks, of which the following is a specification.

This invention is an improvement in locks, and has particular reference to a nut and bolt lock.

An object of the invention is the provision of a novel locking element in the form of a detachable key constructed to be countersunk in a face of a nut and engage the threads of a bolt, whereby the parts may be securely locked in adjusted position.

Another object is to provide the nut with a novel form of recess for receiving the locking element whereby the same is retained in its locked position and the removal of said element from the recess facilitated to permit the nut to be unthreaded from the bolt.

Another object is the provision of a nut lock of this character which is simple in construction, thoroughly practical from a manufacturing and economical standpoint, and effective in carrying out the purpose for which it is designed.

The inventive idea involved is capable of receiving a variety of mechanical expressions, one of which for the purpose of illustrating the invention, is shown in the accompanying drawing wherein—

Figure 1 is a face view of the nut showing the bolt in section, and the locking element in locking position, and constructed in accordance with the invention.

Fig. 2 is a section showing the position of the locking element just previous to its adjustment to locking position.

Fig. 3 is a section similar to Fig. 2, showing the locking element in locking position.

Fig. 4 is a section on the line 4—4 of Fig. 1, showing the manner of removing the locking element from its locking position.

Fig. 5 is a detail perspective view of the locking element.

Fig. 6 shows a somewhat different form at the end of the locking element engaging in the face of the nut.

There is illustrated in the accompanying drawing what is now believed to be a preferred form of the invention, wherein a bolt 5 is adapted to have threaded thereon the nut 6. One face of the nut 6 is provided with a recess generally indicated by the numeral 7 and extending radially with respect to the bolt 5, one end of said recess communicating with the bolt opening in said nut. The bottom of the recess 7 is concaved longitudinally, as indicated at 8, and the shallowest part of said recess is equal in depth to half the width of one of the threads of the bolt 5. The face of the nut containing the recess 7, is also provided with a slot 9 having an inclined bottom, as indicated at 10 in Fig. 4, and the inner end of said slot communicates with one side of the recess 7 and is of a greater depth than said recess, for a purpose which will appear in the course of the description.

The extremity of the recess 11 opposite the end which is in communication with the bolt opening in the nut, is provided with a transverse notch 11 having an angular space 12, said nut being adapted to receive one end of the locking element generally indicated by the numeral 13.

This locking element 13 is preferably formed from a single sheet of material, such as steel, and before being used, the same is arched longitudinally for a major portion of its length, as clearly shown in Figs. 2 and 5, and is flattened adjacent one end, as indicated at 14, in order to provide a surface which may be hammered to facilitate the mounting of the locking lug 15 of said element in the notch 11. This locking lug extends at right angles to the body portion of the locking element and is provided with an angular face 16 which is adapted to engage the angular face 12 of the notch 11. The formation of these angular faces materially assists in retaining the end of the locking element in engagement with the notch 11, so that the same will not become accidentally detached. The end of the locking element 13 opposite the lug 15 is provided with spaced teeth 17 which are adapted to engage between the threads of the bolt 5 and thereby securely maintain the nut in locked position thereon. After the locking element 13 has been placed in the position shown in Fig. 2, the intermediate portion of said locking element is struck with a suitable implement, such as a hammer, until the arched portion of said element is bent into the recess 7 and engages the concaved bottom thereof, as shown in Fig. 3. This flattening of the locking element will cause the teeth 17 to bite into the bolt 5 and thus more securely lock the nut in position thereon.

When it is desired to remove the nut from the bolt, it becomes necessary to displace the locking element 13, and for this purpose a tool 18 having a sharp end may be employed, the end of said tool being inserted into the slot 9 and under the intermediate portion of the locking element, whereby said portion may be bent to its original arched position, and said element extracted from the recess, whereupon the nut may be unthreaded from the bolt.

Instead of a particular form of angular face shown at 16 in Fig. 5, the form shown in Fig. 6 may be employed when so desired.

What is claimed is:

1. In a nut lock, the combination of a bolt, a nut threaded thereon and having a recess in one face communicating with the bolt opening in said nut and extending in a radial direction, said face of the nut being also provided with a slot extending transversely to said recess and communicating therewith, and a locking element having one end anchored in one end of said recess and its other end provided with teeth for engaging the threads of said bolt to prevent turning of the nut thereon, said locking element being adapted to be extracted from its locking position, by the insertion of an implement in said transverse slot and underneath said element.

2. In a nut lock, the combination of a bolt, a nut threaded thereon and having a recess in one face communicating with the bolt opening in said nut, the bottom of said recess being concaved, and a locking element having one end secured in said nut and the major portion thereof engaging the concaved bottom of said recess, the opposite end of said locking element having teeth adapted for engagement with the threads of said bolt.

3. In a nut lock, a nut having in one face a radial concave recess leading to the bolt opening, a notch at the outer end of the recess, and a transverse slot intermediate of the length of the said recess, and a locking member having at one end a lug secured in the notch of the nut, and at its other end with teeth for engagement with the threads of a bolt.

4. As a new article of manufacture, a locking element for nuts and bolts formed from a single sheet of material having one end provided with a laterally extending lug adapted to be anchored in the face of a nut, and its other end provided with teeth for engagement with the threads of a bolt, the major portion of said locking element being arched and having a flattened part between said arched portion and said lug whereby to facilitate the anchoring of the locking element in the face of the nut.

5. In a nut lock, the combination of a bolt, a nut threaded thereon and having a recess in one face extending radially thereof, the outer end of said recess having a transverse notch communicating therewith and provided with an angular face, and a locking element having a laterally projecting lug provided with an angular face adapted to engage a similar face in said notch whereby said element is anchored in locking position, said locking element being also provided with teeth adapted for engagement with the threads of a bolt.

CHARLES R. COCHRAN.

Witnesses:
J. A. COCHRAN,
CHAS. J. SHELTON.

Copies of this patent may be obtained for five cents each, by addressing the "Commissioner of Patents, Washington, D. C."